United States Patent [19]

Dickson

[11] 4,183,153

[45] Jan. 15, 1980

[54] HYPERBOLIC GEOMETRY MODEL

[76] Inventor: Lawrence J. Dickson, 12550 Greenwood N., #304, Seattle, Wash. 98133

[21] Appl. No.: 845,495

[22] Filed: Oct. 26, 1977

[51] Int. Cl.² .............................................. G09B 23/04
[52] U.S. Cl. ......................................................... 35/34
[58] Field of Search ................. 35/30, 31 G, 34, 35 J, 35/69, 70, 71, 72; 46/1 L, 30, 31

[56] References Cited

U.S. PATENT DOCUMENTS

| 800,721 | 10/1905 | Coolidge | 35/70 |
| 1,880,130 | 9/1932 | Goldbach | 35/34 X |
| 2,682,118 | 6/1954 | Larsen | 35/71 X |
| 3,614,835 | 10/1971 | Rice et al. | 35/34 |

FOREIGN PATENT DOCUMENTS 914264  1/1963  United Kingdom ..................... 46/30

OTHER PUBLICATIONS

"Repeating Designs in Surfaces of Negative Curvature"; Article in *American Mathematical Monthly;* Jan. 1937, pp. 33-35.

*Primary Examiner*—William H. Grieb
*Attorney, Agent, or Firm*—Seed, Berry, Vernon & Baynham

[57] ABSTRACT

A hyperbolic geometry model formed by several pieces of flexible material joined along their edges in a predetermined manner. In one embodiment, the pieces are polygons arranged so that the sum of the angles about each vertex or corner exceeds 360°. In a second embodiment the pieces are elongated strips joined edge-to-edge about a center line with the inner strips being comparatively straight and the strips away from the center line having a progressively decreasing radius of curvature. In a final embodiment the pieces are arcuate strips joined edge-to-edge about a center point with the radius of curvature of the strips progressively increasing to a finite limit away from the center point. The resulting hyperbolic geometry model is a sheet of flexible material which, because of its increasing fullness away from the center of the model, exhibits geometric properties which illustrate the characteristics of a hyperbolic plane.

5 Claims, 7 Drawing Figures

HYPERBOLIC GEOMETRY MODEL

BACKGROUND OF THE INVENTION

1. Field of the Invention

This invention relates to geometric surfaces, and more particularly to a model for illustrating the geometric properties of the hyperbolic plane and to a structure for providing a sheet of thin, flexible material which cannot be flattened and which has a large surface area in relation to its volume.

2. Description of the Prior Art

Three basic geometrical surfaces are the Euclidean plane, the spherical plane and the hyperbolic plane. Each of these planes have their own geometric properties. For example, in the familiar Euclidean plane a pair of lines intersecting a third line at right angles are parallel to each other. In a spherical plane, a pair of lines intersecting a third line at right angles (e.g. a pair of meridians intersecting the equator) converge toward each other and eventually overlap. In the hyperbolic plane, a pair of lines intersecting a third line at right angles continuously diverge away from each other.

The geometric properties of the Euclidean plane can be easily demonstrated on a flat, planar surface. Similarly, a spherical geometry model for illustrating the properties of spherical geometry is formed by a simple sphere. However, it has not heretofore been possible to produce a physical model for demonstrating the properties of hyperbolic geometry, except on patches of small intrinsic size.

Although physical, hyperbolic geometry models have not been produced, the characteristics of the hyperbolic plane have been extensively studied and are described in detail in Coxeter, H. S. M., *Non-Euclidean Geometry*, pages 147–167, University of Toronto Press, Toronto, Canada 1942 and Coxeter, H. S. M., *Twelve Geometric Essays*, pages 199–214). Southern Illinois University Press, Carbondale, Illinois 1968. These references decompose the hyperbolic plane into "tessellations" or "tilings"; that is, an arrangement of points, line-segments and simple polygons (called vertices, edges and faces, respectively) such that every edge joins two of the vertices and it is a common side of two of the faces. Although the hyperbolic plane can be described as being composed of these tessellations, the tessellations disclosed therein are distorted so that they can be illustrated in a Euclidean plane. This distortion is necessary since the sum of the angles of the corresponding Euclidean polygons about each vertex exceeds 360°, and it is not possible to accurately portray a collection of polygons having this property in the Euclidean plane.

SUMMARY OF THE INVENTION

The primary object of the invention is to produce a physical embodiment of a hyperbolic geometry model for illustrating the properties of hyperbolic geometry.

It is another object of the invention to fabricate hyperbolic geometry models utilizing a variety of techniques.

These and other objects of the invention are accomplished by simulating a hyperbolic plane with a replica which, while resembling a tessellation of a hyperbolic plane, may, in actuality, be a properly interconnected tessellation composed of Euclidean polygons or strips. Although the possibility of using truly hyperbolic, or "saddle-shaped", polygons or strips as components of the tessellation for especially accurate models is not excluded, it is considered sufficient for most purposes to use Euclidean polygons of small intrinsic area or strips of small intrinsic width, which are only slightly different from their hyperbolic counterparts. Here "intrinsic area" is equal to: (area)×(absolute value of Gaussian curvature), and corresponds to "solid angle" equal to: (area)/(radius)$^2$ on the surface of a sphere. "Intrinsic width" is equal to: (width)×(square root of absolute value of Gaussian curvature). The physical dimension of Gaussian curvature is (Length)$^{-2}$ and a hyperbolic Gaussian curvature is always negative.

The physical model of the hyperbolic plane is constructed by joining several flexible embodiments of these polygons or strips to each other along their edges in a predetermined pattern. Each replica may be composed of Euclidean polygons or strips, but they are joined with others in a manner that near each point approximates the shape of a local segment of the hyperbolic plane. Consequently, the model closely approximates a relatively large segment of the hyperbolic plane. The replicas may be either tessellations with the Euclidean angles about each vertex exceeding 360°, or strips joined edge-to-edge about a center line with the radius of curvature of the strips progressively decreasing to a finite limit away from the center line, or arcuate strips joined edge-to-edge about a center point with the radius of curvature of the strips progressively increasing toward a finite limit away from the center point.

DETAILED DESCRIPTION OF THE PREFERRED EMBODIMENTS

Figure 1:
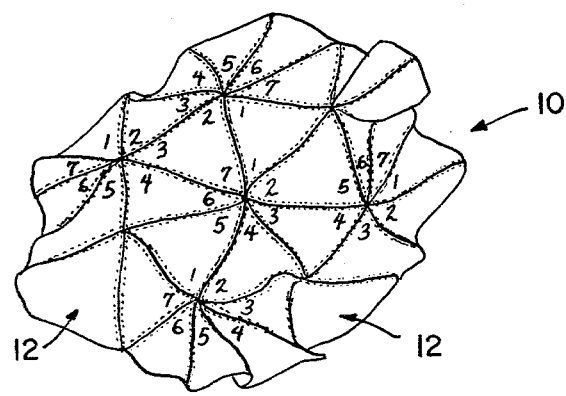
FIG. 1 is an isometric view of one embodiment of the hyperbolic geometry model utilizing a triangular tessellation.

As best illustrated in FIG. 1, one embodiment of a hyperbolic geometry model 10 utilizes a plurality of Euclidean triangles 12 which, when joined to each other, resemble a triangular tessellation of the hyperbolic plane. Each inside angle of the Euclidean triangles is 60°, but, since 7 triangles adjoin each other at each vertex, the sum of the angles about each vertex is 420°

(60°×7). Exact congruence with hyperbolic geometry is not required within each polygon (i.e. the polygon in the Euclidean plane does not correspond exactly to the polygon in the hyperbolic plane). However, the shape of the replica is still limited by certain factors, in order for each portion of the replica to accurately resemble a particular localized area in the hyperbolic plane, so that a collection of such portions represents a relatively large section of the hyperbolic plane. The first requirement is that the length of any two sides of polygons in the replica must have the same ratio as in the abstract tessellation. Secondly, the magnitudes of any two angles in the replica must have the same relationship as in the abstract tessellation so that if one angle is larger than another in the tessellation, that same angle must be larger than the other in the replica. Similarly, if two angles are equal in the tessellation, they must be equal in the replica. Finally, if the sides are straight or of constant curvature in the replica, they must be straight or of constant curvature in the abstract tessellation. Although the term "polygon" is sometimes used solely to designate a plane figure having a large number of sides, the more general mathematical definition, namely, a surface figure having three or more geodesic sides, or a physical object such as a fabric or lattice section having the shape of such a figure, is to be used herein.

Figure 2:
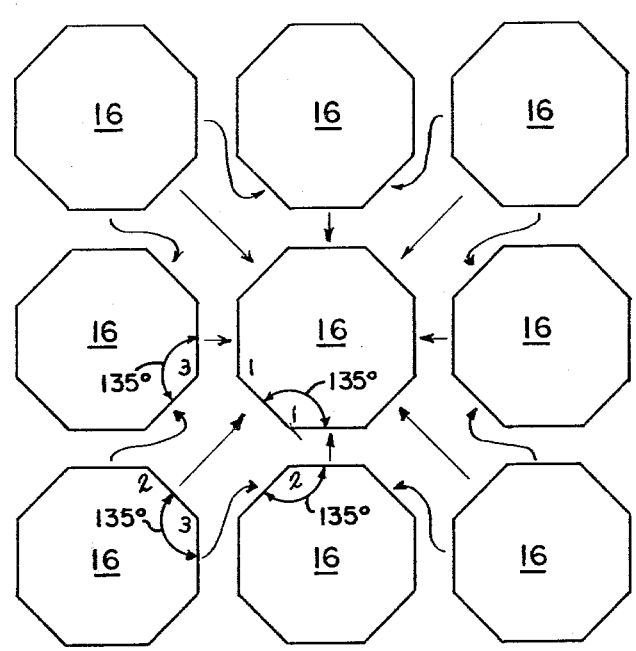
FIG. 2 is an exploded plan view of one embodiment of the hyperbolic geometry model utilizing an octagonal tessellation.

Another embodiment of a hyperbolic geometry model 14 utilizing octagons 16 in the replica, is illustrated in FIG. 2. In a Euclidean octagon the inside angle between each edge is 135°. As illustrated in FIG. 2, each vertex of the octagonal replica is a common vertex of three octagons so that the sum of the angles about each vertex is 405°(135°×3).

Specific arrangements of "regular" polygons, i.e. where all of the sides and angles of the polygons are identical, can be denoted [n,m] indicating that the polygons are n-sided figures repeating m to a corner. In the hyperbolic plane n×m−2m−2n is greater than zero which is equivalent to requiring that the total angle of m Euclidean regular polygons of n sides at one corner is greater than 360°. For a sum of the angles of m Euclidean regular polygons of n sides at one corner equal to 360° produces Euclidean tessellations and if the sum of the angles is less than 360° spherical tessellations (Platonic solids) are produced.

Figure 3:
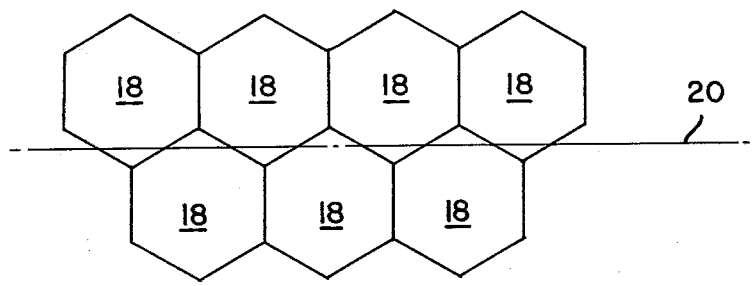
FIG. 3 is a plan view illustrating the manner in which the hyperbolic geometry model can be centered about the edges of two adjacent rows of polygons.
Figure 4:
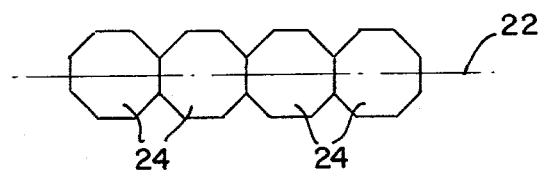
FIG. 4 is a plan view illustrating the manner in which the hyperbolic geometry model can be centered about a strip of polygons.

The replicas may be arranged in four ways: (a) point centered—where the center of the model is m polygons meeting at the point as in FIG. 1, (b) face centered—where the center of the model is the center of a polygon as in FIG. 2, (c) line centered—where the polygons 18 are arranged about a straight line 20 running between parallel rows of polygons as illustrated in FIG. 3, and (d) strip centered—where a straight line 22 runs through the center of a row of polygons 24 as illustrated in FIG. 4. It should be noted that the tessellations of FIGS. 3 and 4 are Euclidean tessellations for illustrative purposes only. In practice, the polygons would be made to produce hyperbolic tessellations.

Figure 5:
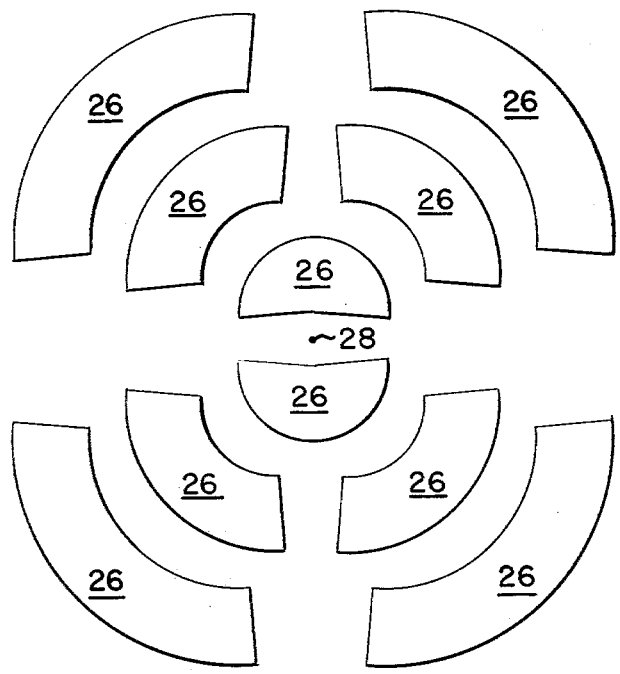
FIG. 5 is a plan view of another embodiment of a hyperbolic geometry model utilizing a plurality of arcuate strips arranged about a centerpoint, each of which has a progressively increasing radius of curvature away from the center point.

A second embodiment of a hyperbolic geometry model as illustrated in FIG. 5 utilizes a plurality of arcuate strips 26 centered about a point 28. The strips 26 each have a radius of curvature which progressively increases away from the point 28. Each of the arcuate strips is a replica of an annulus of the hyperbolic plane. In order for the replicas in Euclidean geometry to closely approximate the annuli in the hyperbolic plane they must have a constant width, their inner and outer edges must have a constant curvature, and each spiral must form an annulus whose inner and outer edges are the same length of the inner and outer edges of the annulus it is modeling on the abstract hyperbolic plane. This means that the ratio between the lengths of the inner and outer edges of each segment must always be the same.

The circumference of a circle in the hyperbolic plane is given by the formula:

$$C = 2\pi \sinh r$$

where r is the radius and C is the circumference of the circle. This formula can be utilized to drive the formula:

$$\frac{\text{Length (inner edge)}}{\text{Length (outer edge)}} = \frac{\sinh (r)}{\sinh (r + w)}$$

where r is the radius of the inner circle in the hyperbolic plane, and w is the width of the strip. Here r and w are "intrinsic" widths, as defined in the Summary of the Invention.

Figure 6:
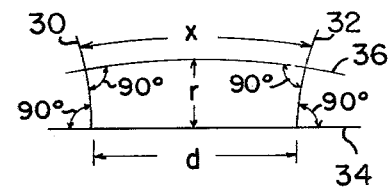
FIG. 6 is an illustration of a geometric property of the hyperbolic plane utilized to construct the embodiment of FIG. 7.
Figure 7:
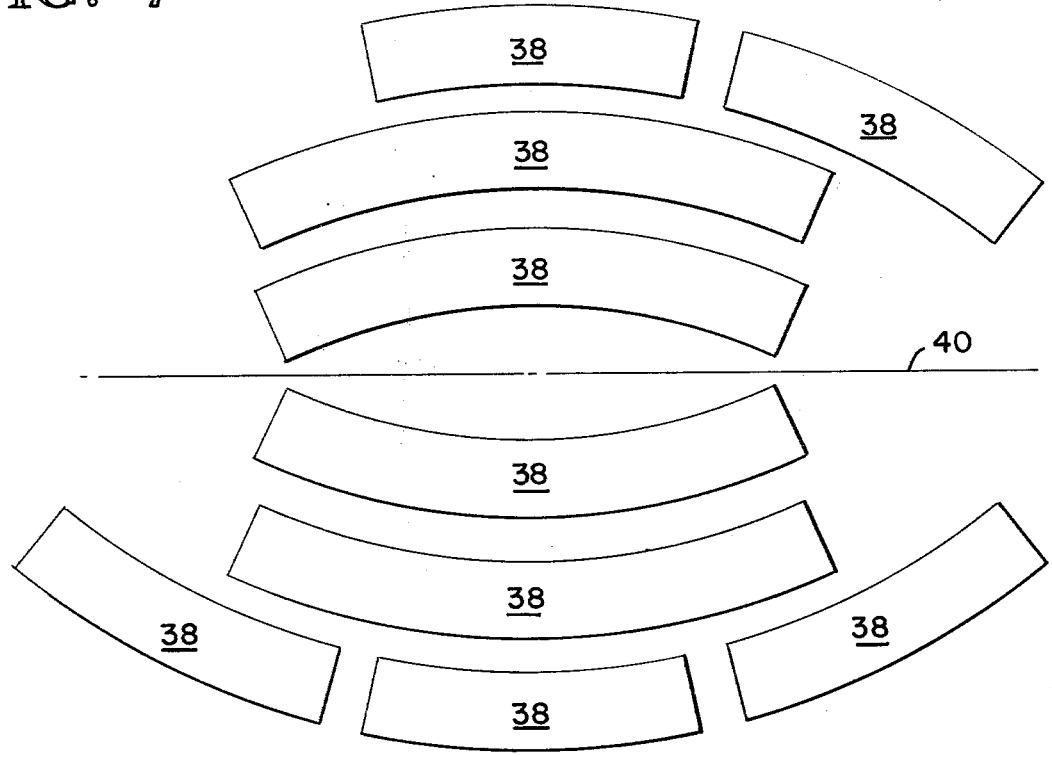
FIG. 7 is a plan view of still another embodiment of a hyperbolic geometry model utilizing a plurality of strips arranged about a center line with each of the strips having a radius of curvature which is progressively reduced away from the center line.

As illustrated in FIG. 6, a pair of lines 30, 32 intersecting a third line 34 at 90°. The lines 30, 32 are spaced apart from each other along the line 34 by a distance d, and a fourth line 36 intersects the lines 30, 32 at 90° and is spaced apart from the line 34 along the lines 30, 32 by a distance r. The length x of the line 36 between the lines 30, 32 can be calculated according to the formula x=d cosh r. This property of the hyperbolic plane can be utilized to derive the hyperbolic geometry model illustrated in FIG. 7 in which a plurality of strips 38 are arranged about a center line 40 with the radius of curvature of the strips progressively decreasing away from the center line. The above formula can be utilized to derive the following formula which can be utilized to calculate the dimensions of the strips 38 illustrated in FIG. 7:

$$\frac{\text{Length (inner edge)}}{\text{Length (outer edge)}} = \frac{\cosh (r)}{\cosh (r + w)}$$

where r is the intrinsic distance from the inner edge of the strip 38 to the center line, and w is the intrinsic width of the strip.

The resulting embodiments of the hyperbolic geometry model closely approximate the hyperbolic plane and exhibit such properties of the hyperbolic plane as an increasing fullness away from a center point or center line. The models may be formed by edge joining replicas made from a variety of flexible materials such as, for example, cloth, and the edge joining can be accomplished through a variety of techniques such as by sewing.

I claim:

1. A hyperbolic geometry model comprising a plurality of flexible annular strips arranged about a center point with the inner edges of said strips joining the outer edges of inwardly adjacent strips, and the side edges of said strips joining the side edges of laterally adjacent strips to form a continuous loop, the radius of curvature of said inner and outer edges being progressively increased away from said center point such that each of said strips correspond to and resemble an annulus of the hyperbolic plane.

2. The hyperbolic geometry model of claim 1 wherein the length of the inner edge of each strip is equal to:

$$L \frac{\sinh(r)}{\sinh(r+w)}$$

where L is the length of the outer edge, r is the intrinsic distance from the center point to the inner edge and w is the intrinsic width of the strip.

3. The hyperbolic geometry model of claim 1 wherein said strips are of constant width, and the inner and outer edges of said strips are of constant curvature and of the same length as the inner and outer edges of the annulus of the hyperbolic plane to which it corresponds and resembles.

4. A hyperbolic geometry model comprising a plurality of flexible arcuate strips arranged about a center line with the outer edges of said strips joining the inner edges of outwardly adjacent strips, the radius of curvature of said inner and outer edges being progressively reduced away from said center line such that each of said strips correspond to and resemble an arcuate strip of the hyperbolic plane.

5. The hyperbolic geometry model of claim 4 wherein the length of the inner edge of each strip is equal to:

$$L \frac{\cosh(r)}{\cosh(r+w)}$$

where L is the length of the outer edge, r is the intrinsic distance from the center line to the inner edge and w is the intrinsic width of the strip.

* * * * *